US005482299A

United States Patent [19]

Saito

[11] Patent Number: 5,482,299

[45] Date of Patent: Jan. 9, 1996

[54] WATER SEAL PLUG FOR CONNECTOR

[75] Inventor: Hitoshi Saito, Shizuoka, Japan

[73] Assignee: Yazaki Corporation, Japan

[21] Appl. No.: 295,067

[22] Filed: Aug. 26, 1994

[30] Foreign Application Priority Data

Aug. 31, 1993 [JP] Japan .................................. 5-216041

[51] Int. Cl.[6] .................................................. F16J 15/02

[52] U.S. Cl. .................... 277/209; 277/210; 277/212 C; 439/274; 439/587

[58] Field of Search .................................. 277/209, 210, 277/212 C, 212 FB; 439/274, 275, 587, 588, 589

[56] References Cited

U.S. PATENT DOCUMENTS

| | | | |
|---|---|---|---|
| 3,913,928 | 10/1975 | Yamaguchi | 277/209 |
| 4,150,866 | 4/1979 | Snyder, Jr. et al. | 439/275 |
| 4,214,802 | 7/1980 | Otani et al. | 439/275 |
| 4,374,604 | 2/1983 | Hemmer et al. | 439/587 |
| 4,909,760 | 3/1990 | O'Keefe, II et al. | 439/587 X |
| 5,035,638 | 7/1991 | Kourimsky | 439/275 |
| 5,351,973 | 10/1994 | Taniuchi et al. | 439/587 X |
| 5,352,126 | 10/1994 | Kuboshima et al. | 439/587 X |

FOREIGN PATENT DOCUMENTS

| | | |
|---|---|---|
| 58-29575 | 6/1983 | Japan . |
| 58-29576 | 6/1983 | Japan . |

*Primary Examiner*—William A. Cuchlinski, Jr.
*Assistant Examiner*—Scott W. Cummings
*Attorney, Agent, or Firm*—Venable, Baetjer, Howard & Civiletti

[57] ABSTRACT

A water seal plug for use on an electrical connector, improved to cover a sealing surface such that it can be exposed when the plug is used, so as to protect the sealing surface while ensuring superior sealing effect. The water seal plug has the following portions: a cylindrical plug body having a wire passage bore formed therein and an outer peripheral surface serving as a sealing surface; an annular supporting portion connected to the rear end of the plug body; and a cover sleeve which is connected to the rear end of the plug body through the annular supporting portion, the cover sleeve being extended forwardly from the annular supporting portion so as to cover the sealing surface of the plug body. The cover sleeve is able to be unfolded at the annular supporting portion so as to extend rearward thereby to expose the sealing surface.

8 Claims, 2 Drawing Sheets

WATER SEAL PLUG FOR CONNECTOR

BACKGROUND OF THE INVENTION

1. Field of the Invention

The present invention relates to a water seal plug for a waterproof connector which is used in, for example, electrical connections in automotive wire harnesses. More particularly, the present invention is concerned with a waterproof connector plug in which outer peripheral sealing surface of the plug is protected against any external damaging force, dust and so forth.

2. Description of Related Arts

In general, a water seal plug of a waterproof connector has a bore for passing electrical lines to pass therethrough and an outer peripheral sealing surface which contacts a mating wall of the connector so as to form a seal against water. The outer peripheral sealing surface is exposed to the exterior and, therefore, is likely to be damaged or contaminated with dust, so as to impair the sealing performance.

In order to overcome this problem, hitherto, a water seal plug has been proposed in which a skirt is formed on the portion of the plug which fits the connector, the skirt being folded back inward such that the inner surface of the skirt serves as the sealing surface which engages with the mating surface of the connector.

This plug, however, cannot provide satisfactory sealing effect because the portion of the skirt folded back inward is not directly supported by the main part of the plug.

SUMMARY OF THE INVENTION

Under this circumstance, an object of the present invention is to provide a waterproof connector seal plug which is improved so as to protect the sealing surface and to achieve distinguished water sealing performance.

To achieve this object, the water seal plug of the invention is so constructed that a sealing surface of a plug body is protected by being covered in such a manner as to be exposed when the plug is actually used.

More specifically, according to the present invention, there is provided a water seal plug which has the following portions: a cylindrical plug body having a wire passage bore formed therein and an outer peripheral surface serving as a sealing surface; an annular supporting portion connected to the rear end of the plug body; and a cover sleeve which is connected to the rear end of the plug body through the annular supporting portion, the cover sleeve being extended forwardly from the annular supporting portion so as to cover the sealing surface of the plug body, the cover sleeve being able to be unfolded at the annular supporting portion so as to extend rearward thereby to expose the sealing surface.

According to the invention, the sealing surface on the plug body is normally covered and protected by the cover sleeve. When the plug is pressfitted into an electrical connector, the cover sleeve is progressively unfolded to expose the sealing surface to bring the sealing surface into pressure contact with the inner surface of the connector, thus achieving excellent sealing effect.

In a preferred form of the invention, at least one slit is formed in the cover sleeve so as to facilitate unfolding of the cover sleeve.

The above and other objects, features and advantages of the present invention will become clear from the following description when the same is read in conjunction with the accompanying drawings.

DESCRIPTION OF THE PREFERRED EMBODIMENTS

Figure 1:
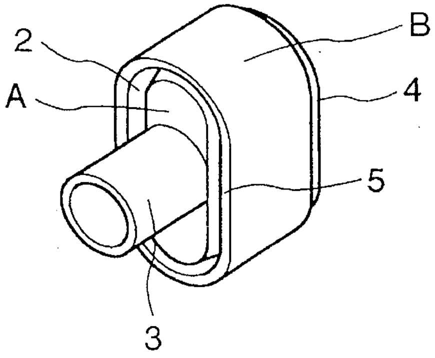
FIG. 1 is a perspective view of an embodiment of a water seal plug in accordance with the present invention.
Figure 2:
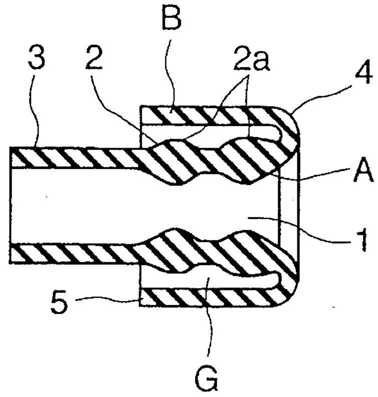
FIG. 2 is a longitudinal sectional view of the water seal plug shown in FIG. 1.

Referring to FIGS. 1 and 2, a water seal plug of the invention for use in a waterproof electrical connector has a substantially cylindrical plug body A which is made of an elastic material such as rubber. The plug body A has a central bore 1 for passing an electrical wire therethrough, and an outer peripheral surface 2 which serves as a sealing surface 2. The sealing surface 2 is provided with annular ribs 2*a*. One end (referred to as "front" end in this case) of the cylindrical wall defining the wire passage bore 1 is forwardly extended so as to form a connector sleeve 3. An annular supporting portion 4 is provided on the outer periphery of the rear end of the plug body A.

The plug also has a cover sleeve B which surrounds the sealing surface 2 of the plug body A across a gap G. The cover sleeve B is cantilevered by the annular supporting portion 4, so that the free end of the sleeve B is directed forward.

The operation of the plug when pressed into a connector is as follows.

Figure 3:
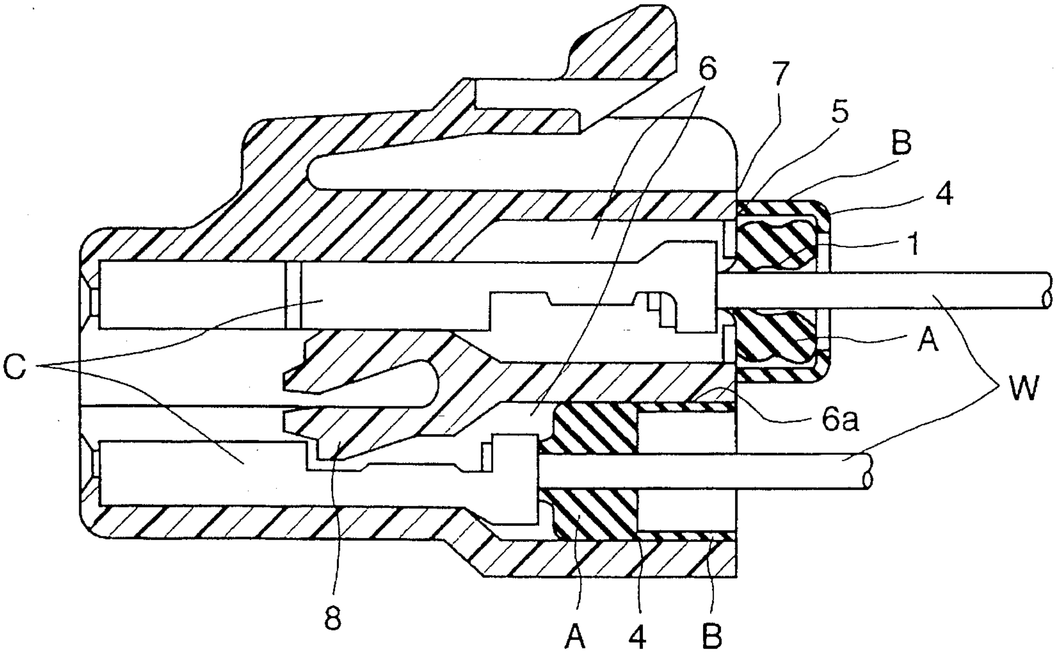
FIG. 3 is a sectional view of the water seal plug shown in FIGS. 1 and 2 set to a state of use.

An electric wire W is led into the wire passage bore 1 and is extended through the connector sleeve 3 so as to be connected to a terminal member C. The terminal member C is then inserted into a terminal chamber 6 which is defined in a connector housing. As a result, the free end 5 of the cover sleeve B abuts the rear end 7 of the connector housing, as shown at upper half part of FIG. 3. As the terminal member C is further moved deeper into the connector housing, the cover sleeve B is progressively unfolded and, in the fully-inserted state in which the terminal member C is engaged by a flexible engaging member 8 provided on a wall of the terminal chamber, the unfolded cover sleeve B is straightened to extend rearward into contact with the inner wall surface 6*a* of the terminal chamber 6, as shown at lower half part of FIG. 3. In this state, the sealing surface 2 has been revealed and held in pressure contact with the wall surface of the terminal chamber in the connector housing.

Figure 4:
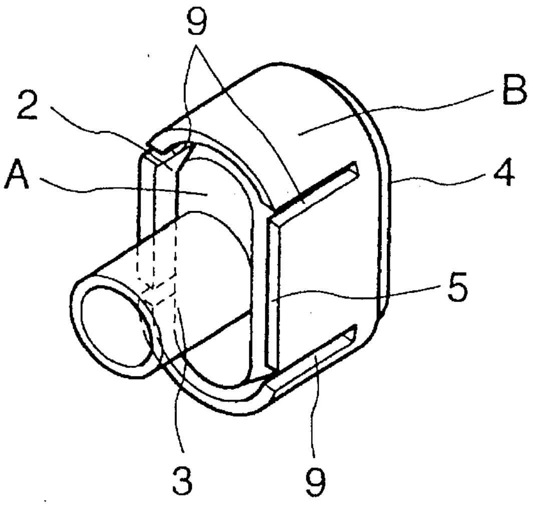
FIG. 4 is a perspective view of another embodiment of the water seal plug in accordance with the present invention.
Figure 5:
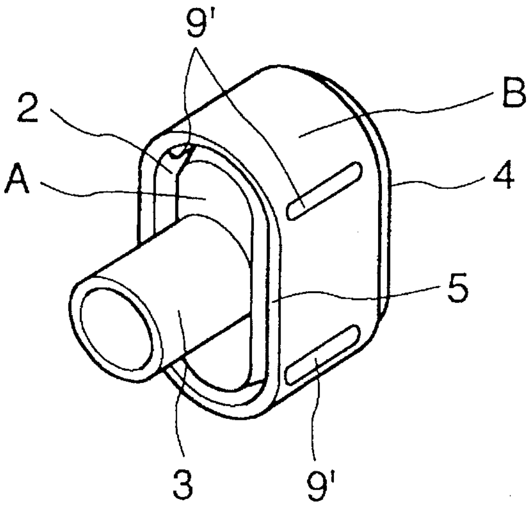
FIG. 5 is a perspective view of still another embodiment of the water seal plug in accordance with the present invention.

FIG. 4 shows another embodiment of the waterproof connector seal plug of the invention. In this embodiment, the cover sleeve B is provided with a plurality of slits 9 which extend from the free end 5 of the cover sleeve B towards the annular supporting portion 4. FIG. 5 shows still another embodiment of the waterproof connector seal plug of the invention. In this embodiment, the cover sleeve B is provided with a plurality of slits 9' which extend from an intermediate portion of the cover sleeve B towards the annular supporting portion 4. In the embodiments shown in FIGS. 4 and 5, unfolding of the cover sleeve B is facilitated by virtue of the provision of the slits 9, 9'.

As will be realized from the foregoing description, the waterproof connector seal plug of the present invention has a sealing surface which is normally covered and protected by the cover sleeve. When the plug is fitted in the connector, the cover sleeve is unfolded to expose the sealing surface so as to bring the sealing surface into contact with the inner surface of the connector. Thus, the present invention provides effective protection of the sealing surface, as well as high sealing performance.

Want is claimed is:

1. A water seal plug for an electrical connector, comprising:

a substantially cylindrical plug body having a central wire passage bore and an outer peripheral surface which serves as a sealing surface;

an annular supporting portion connected to a rear end of said plug body; and a cover sleeve which covers said sealing surface in such a manner as to expose said sealing surface when said plug is used, wherein said cover sleeve continues from said annular supporting portion and extends forward therefrom so as to cover said plug body, said cover sleeve being able to be unfolded at said annular sunporting portion to expose said sealing surface.

2. A water seal plug for an electrical connector according to claim 1, wherein at least one slit is formed in said cover sleeve.

3. A water seal plug for an electrical connector according to claim 2, wherein said slit is formed to extend from a front free end of said cover sleeve towards the opposite end of said cover sleeve.

4. A water seal plug for an electrical connector according to claim 2, wherein said slit extends over an axially intermediate region between a free end and a support surface end of said cover sleeve.

5. A water seal plug for an electrical connector, comprising:

a substantially cylindrical plug body having a wire passage bore formed therein and an outer peripheral surface serving as a sealing surface, said plug body being adapted to be press-fitted in said electrical connector;

an annular supporting portion connected to a rear end of said plug body which is remote from said electrical connector as viewed in the direction of fitting movement of said plug body; and a cover sleeve which is connected to the rear end of said plug body through said annular supporting portion, said cover sleeve being extended forwardly from said annular supporting portion so as to cover said sealing surface of said plug body, said cover sleeve being able to be unfolded at said annular supporting portion so as to extend rearward thereby to expose said sealing surface.

6. A water seal plug for an electrical connector according to claim 5, wherein said cover sleeve has a free front end adapted to abut a rear end surface of said connector to which said plug body is press-fitted.

7. A water seal plug for an electrical connector according to claim 6, wherein a plurality of slits are formed in said cover sleeve so as to extend from said free end of said cover sleeve towards said annular supporting portion.

8. A water seal plug for an electrical connector according to claim 6, wherein a plurality of slits are formed in said cover sleeve so as to extend from an intermediate portion of said cover sleeve towards said annular supporting portion.

* * * * *